Patented Jan. 20, 1948

2,434,765

UNITED STATES PATENT OFFICE 2,434,765

1-AMINO-2-HYDROXYALKYLTHIO-4-ARYL-AMINO-ANTHRAQUINONES

Paul Grossmann, Binningen, Switzerland, assignor to Society of Chemical Industry in Basle, Basel, Switzerland, a Swiss firm No Drawing. Appl'cation March 8, 1945, Serial No. 581,717. In Switzerland January 13, 1944

Section 1, Public Law 690, August 8, 1946
Patent expires January 13, 1964

6 Claims. (Cl. 260—378)

The present invention is concerned with new anthraquinone derivatives. More particularly the present invention is concerned with aminoanthraquinones containing a thioether group. It is an object of the present invention to provide such compounds which are useful as acetate rayon dyestuffs. Further objects will appear as the specification proceeds.

It is well known that many aminoanthraquinones are useful acetate rayon dyestuffs. Some of them yield valuable and strong blue shades, but many are defective in fastness to light or do not yield strong shades. Furthermore it is an unpleasant property of most blue aminoanthraquinone acetate rayon dyes that they do not only fade on exposure to light, but that their shade is displaced towards red. It is an object of the present invention to provide new acetate rayon dyes which are superior to the old dyes in at least one of these respects.

According to the present invention valuable anthraquinone derivatives are made by introducing a phenylamino group the phenyl radical of which is free from aliphatic side chains into a further $\alpha$-position of an $\alpha$-aminoanthraquinone, and an alkylthioether group the alkyl radical of which contains at most 6 carbon atoms into a $\beta$-position.

Suitable parent materials for the present process are preferably anthraquinones substituted in such a manner that the substituents already present facilitate the introduction of the above named groups, or that they can be exchanged directly or indirectly for the said groups. It is thus possible to start from a 1-aminoanthraquinone with for example a secondary, for instance, methylated amino group, or preferably primary amino group, which contains in a further $\alpha$-position, preferably in 4-position, a substituent capable of being exchanged for a phenyl-amino group. Examples of such substituents are halogen, particularly bromine as well as nitro groups and hydroxyl groups. According to circumstances also the leuco stage of the respective anthraquinone substitution product can be used for the reaction.

These anthraquinone substitution products can be reacted in known manner with aniline or its substitution products which are free from aliphatic side chains such as para-phenylenediamine or para-aminophenol, in such a manner that $\alpha$-aminoanthraquinones are formed which possess an anilino group in a further $\alpha$-position, preferably in para-position to the amino group. The anilino group can also be introduced in several stages in such a manner that first of all an amino group is introduced at the desired position of the anthraquinone molecule and that this is then phenylated in known manner. It is to be noted that an aliphatic side chain in the said anilino group deleteriously affects the affinity of the dyestuff for acetate rayon.

The introduction of a low molecular alkylthioether group into a $\beta$-position of the anthraquinone nucleus can also be effected in known manner, for example by replacing a substituent attached at the desired position, for example a halogen atom or a sulfonic acid group, first of all by a mercapto group, and then treating the resulting mercaptan with alkylating agents. The alkylthioether group can be introduced into any desired $\beta$-position of the anthraquinone nucleus. It is preferable, however, to select for this purpose a $\beta$-position standing in ortho-position to an amino group.

The alkyl radical of the thioether grouping must not contain more than 6 carbon atoms and should preferably be composed of 1 to 4 carbon atoms. Thus it may be for example methyl, ethyl, propyl, isopropyl or butyl. The said alkyl radicals may contain substituents such as halogen and preferably they may be substituted by hydroxyl groups. Mercapto groups are as a rule very easily etherified by reaction with halogen alkyl compounds and hydroxy-alkylthioethers are obtained in a simple manner by reacting the said mercapto compounds with the corresponding halogen hydrins of glycol, glycerol, propanediol, butanediol, etc.

The introduction of the various substituents into the anthraquinone molecule can be effected in any desired sequence. For example, an anilino group can be introduced into the easily accessible 1-amino-2:4-dibromoanthraquinone first of all by reaction of the bromine atom in a 4-position with aniline in excess, the 1-amino-2-mercapto-4-anilinoanthraquinone can be produced from the resulting 1-amino-4-anilino-2-bromoanthraquinone by reaction with sodium sulfide, and this can be etherified with glycolic chlorohydrin or glycerine chlorohydrin. The procedure is similar when starting from 1-amino-4-bromoanthraquinone-2-sulfonic acid, whereas another sequence of the reactions is indicated when using other parent materials.

The anthraquinone derivatives obtained according to the present process can be used as intermediate products. They represent, however, valuable dyestuffs for dyeing and printing cellulose esters and cellulose ethers, especially acetate rayon, and can further be used for dyeing and printing other fibers, such as superpolyamide fibers. There are obtained, inter alia, valuable blue dyeings and prints which are very fast to light, their shade being not displaced towards red on exposure to light.

For dyeing acetate rayon these dyestuffs are preferably used in a finely dispersed form as is obtained for example by dissolving the dyestuff in an indifferent solvent and precipitating it by mixing the solution with a non-solvent. When using sulfuric acid as solvent it is appropriate, in order to avoid sulfonation, to work at a low temperature, for example, at 0–5° C. and with aqueous sulfuric acid.

The dyestuffs thus obtained can also be used in admixture with one another or with other dyestuffs for acetate rayon.

The following examples illustrate the invention, the parts being by weight:

Example 1

180 grams of 1-amino-2:4-dibromoanthraquinone are heated for 1 hour to 130–140° C. in 600 grams of aniline with 3.6 grams of copper carbonate and 90 grams of potassium acetate. The reaction product is precipitated at 80–90° C. by addition of 600 cc. of methyl alcohol (or ethyl alcohol), filtered when cold, the aniline is washed out with methyl alcohol and the potassium salts are then washed out with water. 165–170 grams of 1-amino-4-anilido-2-bromoanthraquinone are thus obtained.

100 grams of the resulting product are heated in an iron autoclave for 5 hours to 90° C. together with 300 cc. of methyl alcohol, 75 cc. of water, 0.75 gram of sodium carbonate, 200 cc. of a solution of sodium hydrosulfide with a content of 24.6 per cent. by volume+3.6 per cent. of $Na_2S$, 100 cc. of caustic soda solution of 40 per cent. strength by volume and 50 grams of sulfur. The alcohol is distilled off, the residue is rinsed with 400 cc. of caustic soda solution of 1 per cent. strength, the mercaptan is precipitated with 200 grams of common salt, cooled if necessary to 10–15° C. and filtered. The filtrate is colored only feebly, but no longer blue. It is washed free from S-ions with 800 cc. of a solution of 20 per cent. of common salt and 1 per cent. of sodium carbonate (test with lead acetate).

The mercaptan is immediately heated in 1000 cc. of sodium carbonate solution of 1 per cent. strength with 30 cc. of glycerine chlorohydrin until the solution is colorless (at about 70° C.), whereupon it is filtered and washed with water when cold. There are obtained 100 to 105 grams of 1-amino-4-anilidoanthraquinone-2-dihydroxypropylthioether of the probable formula

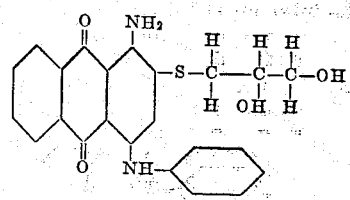

in the form of a dark blue powder which dissolves in concentrated sulfuric acid, when highly diluted, to a dirty greenish blue solution, at a higher concentration to a reddish blue solution and in acetone to a blue solution, and dyes acetate rayon powerful blue shades which are fast to light.

Example 2

When replacing in Example 1 the 30 cc. of glycerine chlorohydrin by 22 cc. of ethylene chlorohydrin, there is obtained a very similar dyestuff which dissolves however in concentrated sulfuric acid to a dirty violet solution.

Example 3

15 parts of 1-methylamino-2:4-dibromoanthraquinone are heated for 1¼ hours to 130–140° C. in 50 parts of aniline and 0.3 part of copper carbonate and 7.5 parts of potassium acetate. The product is worked up as indicated in Example 1.

10 parts of the resulting product are heated for 5 hours to 90° C. with 20 parts of a solution of sodium hydrosulfide of 28 per cent. strength, 10 parts of caustic soda solution of 40 per cent. strength, 5 parts of sulfur, 7.5 parts of water and 30 parts of alcohol. The subsequent reaction of the mercaptan with ethylene chlorohydrin is carried out as described in Example 1. The dyestuff of the probable formula

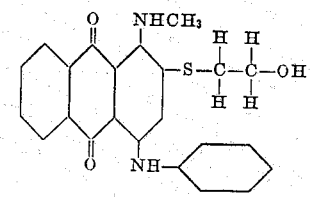

dissolves in concentrated sulfuric acid to a dirty blue red solution, which is displaced towards green blue when adding para-formaldehyde, in acetone to a reddish blue solution, and dyes acetate rayon blue shades.

A similar dyestuff is obtained when starting from 1-ethanolamino-2:4-dibromoanthraquinone.

Example 4

11 parts of 1-amino-4-(4'-aminophenyl)-aminoanthraquinone-2-sodium sulfonate (obtained by condensation of 1-amino-4-bromoanthraquinone-2-sulfonic acid with paraphenylene diamine in water in the presence of copper and sodium carbonate) are heated for 5 hours to 90° C. with 20 parts of a solution of sodium hydrosulfide of 28 per cent. strength, 10 parts of caustic soda solution of 40 per cent. strength, 5 parts of sulfur and 37.5 parts of water. The resulting mercaptan is precipitated with common salt, filtered, washed with common salt solution and the sodium salt of the mercaptan is immediately heated to 80–100° C. with 2.2 parts of ethylene chlorohydrin.

The dyestuff of the probable formula

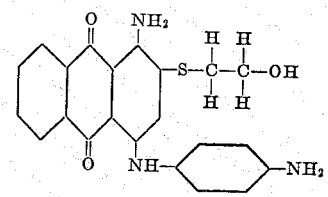

dissolves in concentrated sulfuric acid to a blue red solution which is displaced towards green blue when adding para-formaldehyde, in acetone to a green blue solution, and dyes acetate rayon powerful blue green shades.

A similar dyestuff is obtained by starting from 1-amino-4-(4'-hydroxyphenyl)-aminoanthraquinone-2-sulfonic acid or by carrying out the etherification with glycerine chlorohydrine.

Example 5

0.8 part of the dyestuff obtained according to Example 1 and 0.2 part of the dyestuff obtained according to Example 2 are made into a paste in usual manner. To the paste of about 20 per cent.

strength there are added about 100 parts of a soap solution prepared with soft water and containing 2 grams of soap per liter, the whole is thoroughly mixed and the entire mixture is added to a bath of 3000 parts of soft water containing 6 parts of soap. 100 parts of wetted acetate rayon are introduced at 40° C., the temperature is gradually raised to 80° C. and dyeing is continued for 1 hour at 80° C. The rayon is rinsed and finished as usual. It is dyed powerful blue shades which are fast to light.

What I claim is:

1. An aminoanthraquinone of the formula

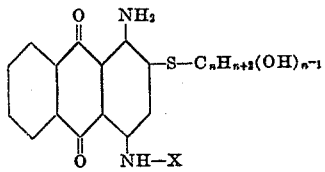

wherein $n$ stands for one of the integers 2 and 3, and X stands for a member selected from the group consisting of phenyl, para-aminophenyl and para-hydroxyphenyl.

2. An aminoanthraquinone of the formula

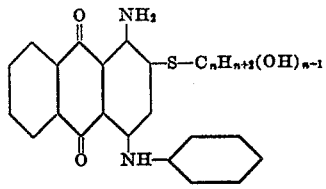

wherein $n$ stands for one of the numbers 2 and 3.

3. The aminoanthraquinone of the formula

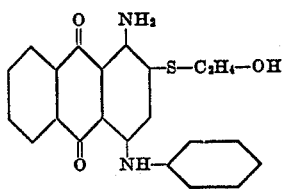

4. The aminoanthraquinone of the formula

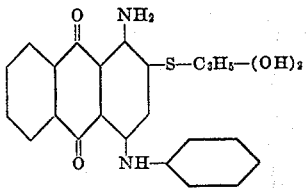

5. An aminoanthraquinone of the formula

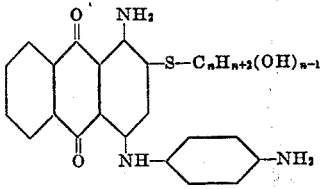

wherein $n$ stands for one of the numbers 2 and 3.

6. The aminoanthraquinone of the formula

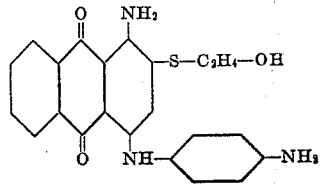

PAUL GROSSMANN.

REFERENCES CITED

The following references are of record in the file of this patent:

UNITED STATES PATENTS

| Number | Name | Date |
|---|---|---|
| 1,710,992 | Kranzlein et al. | Apr. 30, 1929 |

FOREIGN PATENTS

| Number | Country | Date |
|---|---|---|
| 29,139 | Great Britain | 1909 |
| 263,178 | Great Britain | Mar. 19, 1928 |
| 263,843 | Great Britain | Apr. 5, 1928 |
| 124,527 | Switzerland | Mar. 16, 1928 |
| 127,439 | Switzerland | Sept. 1, 1928 |